United States Patent [19]

Zinser

[11] Patent Number: 5,448,768
[45] Date of Patent: Sep. 5, 1995

[54] AIRCRAFT DATA COMMUNICATION EMPLOYING EXISTING VOICE CHANNELS

[75] Inventor: Richard L. Zinser, Niskayuna, N.Y.

[73] Assignee: General Electric Company, Schenectady, N.Y.

[21] Appl. No.: 130,811

[22] Filed: Oct. 4, 1993

[51] Int. Cl.⁶ .............................. H03C 1/52
[52] U.S. Cl. ............................ 455/108; 455/46; 455/47; 455/156.1
[58] Field of Search .............. 342/30, 36, 46, 352, 342/357; 455/46, 45, 47, 54.1, 53.1, 202, 108; 370/76, 110.1; 375/5; 381/3, 4, 14; 340/948, 947, 945, 961

[56] References Cited

U.S. PATENT DOCUMENTS

| | | | |
|---|---|---|---|
| 3,668,403 | 6/1972 | Meilander | 235/150.23 |
| 3,697,997 | 10/1972 | Cooper | 343/108 R |
| 4,369,425 | 1/1983 | Andersen et al. | 340/26 |
| 5,023,934 | 6/1991 | Wheelless | 455/45 |
| 5,073,779 | 12/1991 | Skogmo et al. | 342/36 |
| 5,124,979 | 6/1992 | Matui | 370/76 |
| 5,153,836 | 10/1992 | Fraughton et al. | 342/30 |
| 5,220,681 | 6/1993 | Belgin | 455/156.1 |
| 5,262,784 | 11/1993 | Drobnicki et al. | 342/46 |

Primary Examiner—Edward F. Urban
Assistant Examiner—Mary M. Lin
Attorney, Agent, or Firm—Lawrence P. Zale; Marvin Snyder

[57] ABSTRACT

A system for communicating data between an aircraft and ground unit over conventional amplitude modulated (AM) voice radio channels employs a data collection unit for collecting data desired to be transmitted, such as global positioning system (GPS) data, altitude, or aircraft identification information which is encoded by a data encoder. A gating means senses when the microphone of the AM transmitter is keyed, and passes the encoded data and the voice signals to the existing AM modulator of the AM voice transceiver. This results in a transmitted signal received by a receiving unit, such as a ground unit, which separates the received signal into an AM modulated voice signal and a AM data signal. The AM voice signal is demodulated by normal means into an audible signal, with the AM data signal being decoded by a data decoder into data. This data may be used to identify the aircraft symbol on a radar screen, identify the voice signal with a aircraft identification number, or flight number thereby reducing the amount of identification required. In alternative embodiments, avionics equipment may be added to the aircraft responsive to the data being sent from the ground unit, allowing collision avoidance capabilities.

25 Claims, 4 Drawing Sheets

AIRCRAFT DATA COMMUNICATION EMPLOYING EXISTING VOICE CHANNELS

BACKGROUND OF THE INVENTION

1. Field of the Invention

This invention relates to aircraft communication and more specifically to automated data communication employing existing aircraft radio channels.

2. Description of Related Art

Typical communication between aircraft and air traffic controllers is performed using a two-way radio system. Each pilot verbally identifies their aircraft by an alphanumeric call sign to the air traffic controllers. Much of the time is transmitting the call sign of the aircraft. In congested terminal areas, the present simplex VHF-amplitude modulated (AM) voice radio systems may become overloaded. There is not enough time for all verbal communication of the transmissions required with the increase in radio communication traffic, the problem worsens.

An additional problem occurs when several pilots attempt to transmit at once producing unrecognizable garble to the air traffic controllers.

Currently, there is a need for rapid information transmission, such as aircraft identification, thereby allowing additional time for communication between pilots and air traffic controllers.

OBJECTS OF THE INVENTION

An object of the present invention is to communicate information between an aircraft and an air traffic control unit efficiently thereby alleviating congestion of the existing radio frequencies.

Another object of the present invention is to transmit information between the aircraft and the air traffic controllers more quickly and accurately than the prior art.

Another object of the present invention is to provide an apparatus which is readily adaptable to existing aircraft radio systems which provides information between air traffic controllers on the ground and the aircraft.

SUMMARY OF INVENTION

The present invention is a system which may be a "stand-alone" aircraft amplitude modulated (AM) voice transmitter/receiver ("tranceiver") or be retrofitted to existing AM aircraft transceivers which transmits encoded data, such as aircraft identification or location, in the existing aircraft AM voice band when triggered by the microphone keybutton. Information desired to be transmitted is encoded by a data encoder and passed to the existing AM modulator with a voice transmission signal. The encoded data may be sent when the keybutton is first depressed before voice transmission, or after the keybutton is released and after voice transmission controlled by a transmitter gating unit. The signal is received by a receiving unit, which may be air traffic control unit, and separated by a receiver gating unit into AM voice and AM data signals. The voice signal is demodulated as it would be in conventional AM radio systems, with the AM data signal being decoded into data. This data may be used to identify the aircraft to a radar representation of it, or link a voice signal to an aircraft identification number for example.

In alternative embodiments, the base station may also send encoded data, such as changes to the clearance instructions to the aircraft

BRIEF DESCRIPTION OF THE DRAWINGS

The features of the invention believed to be novel are set forth with particularity in the appended claims. The invention itself however, both as to organization and method of operation, together with further objects and advantages thereof, may best be understood by reference to the following description taken in conjunction with the accompanying drawings in which:

DETAILED DESCRIPTION OF THE INVENTION

Figure 1:
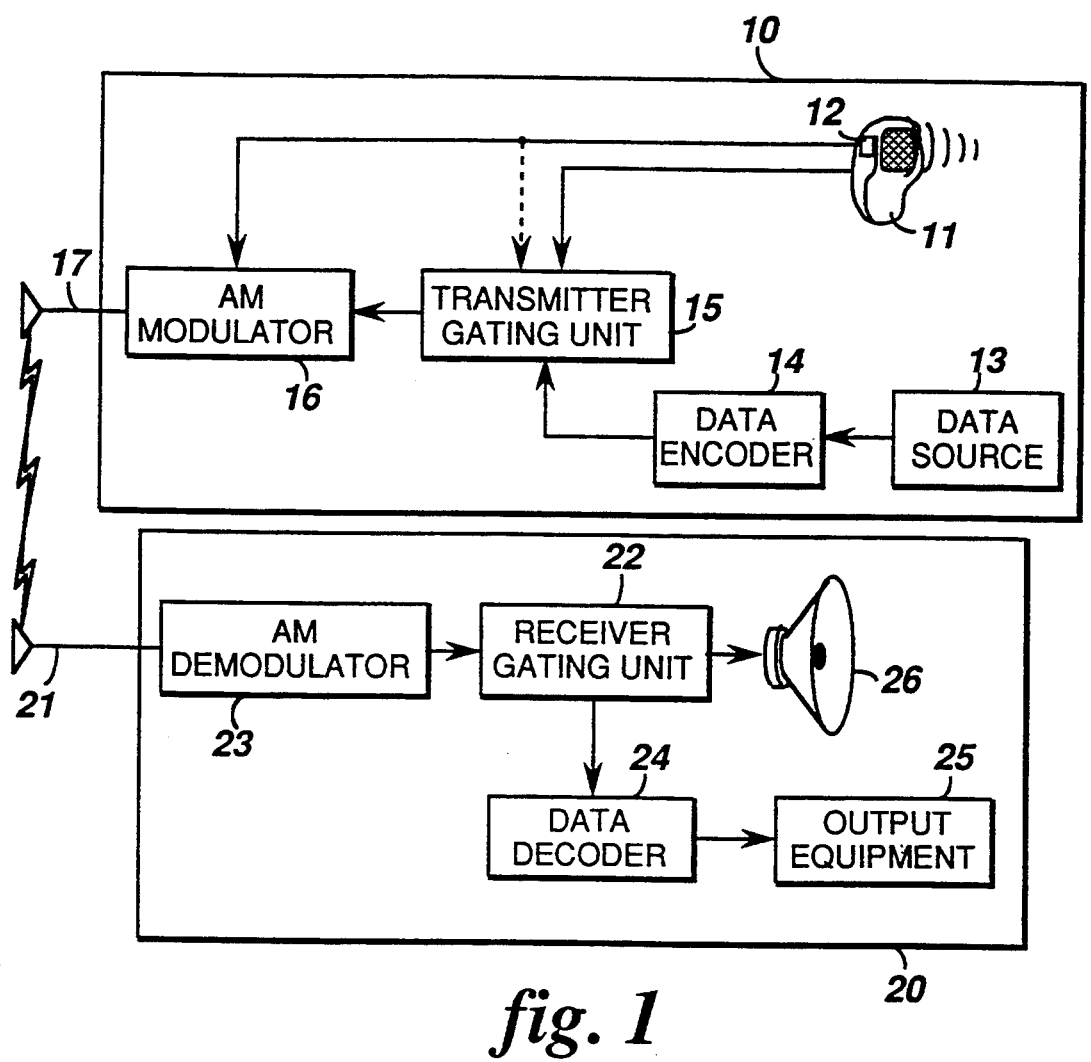
FIG. 1 is a simplified block diagram of one embodiment of the present invention.

FIG. 1 shows a transmitter 10 in an aircraft transmitting information to a receiver 20 in an air traffic control unit to provide data downlink capability. Transmitter 10 could be part of the air traffic control unit with receiver 20 being in the aircraft providing data uplink capacity. For purpose of simplicity, only a transmitter is shown and a receiver is shown, but both may be employed in a single unit. An operator keys a microphone 11 in transmitter 10 by pressing the, push-to-talk switch, "keybutton" 12, when the operator wishes to communicate information to receiver 20. Keybutton 12 is coupled to a data encoder 14. Data encoder 14 receives information, which may be from aircraft equipment, when the transmitter is in the aircraft, or may receive information from ground equipment when the transmitter is part of a base station. Data encoder 14 may encode the data it receives in a 2 level or 4 level AM scheme. Data encoder may also encode the data in a conventional subcarrier modulation scheme. Aircraft equipment may be an altimeter, a global positioning system (GPS), or any other aircraft instruments. In the aircraft, the data source 13 may also be a programmable unit which would be initialized by an operator in the aircraft, with information such as flight number, aircraft identification member, etc.

Data encoder 14 encodes data from data source 13 in an amplitude modulated (AM) format and provides it to a gating means 15. Gating unit 15 is also coupled to keybutton 12, and a voice output of microphone 11. Gating means 15 is triggered by an operator keying microphone 11 by pressing keybutton 12. Gating means 15 then provides the signal from data encoder 14 and the voice output of microphone 11 to an AM modulator 16. Gating means 15 may provide the signal from data encoder 14 before the voice output of microphone 11 when keybutton 12 is depressed or in the alternative, provide the signal from data encoder 14 after voice information from microphone 11 after keybutton 12 is released. An antenna 17 coupled to AM modulator 16 transmits the signal from AM modulator to an antenna 21 of receiver 20.

Figure 2:
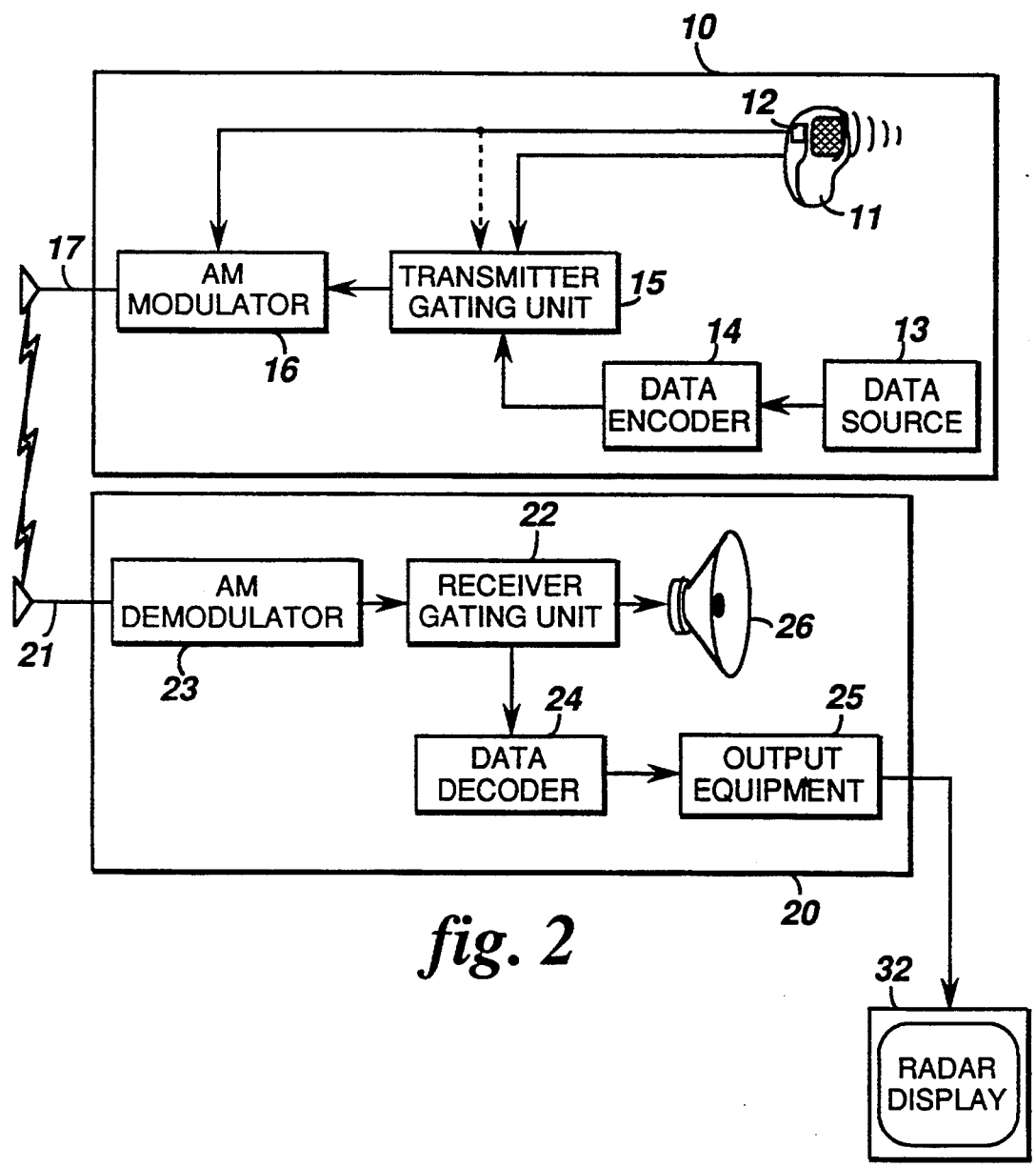
FIG. 2 is a simplified block diagram of a second embodiment of the present invention.

At receiver 20, an AM demodulator 23 demodulates the signal from antenna 21 into a demodulated signal which is passed to a receiver gating means 22. Receiver gating means 22 then separates the demodulated signal into a voice signal and a data signal. The voice signal is provided to audio output unit 26 which reproduces speech similar to that first provided to microphone 11 of transmitter 10. The data signal from AM demodulator 23 is provided to a data decoder 24 which decodes the data signal by a 2 level AM scheme, a 4 level AM scheme or subcarrier demodulation scheme into data. This data is them utilized by output equipment 25. Thins encompasses many different methods of displaying the information, such as a printout of data as it is received. The output equipment could be a superposition means 31 which displays transmitted data on a RADAR display 32 as shown in FIG. 2. This information may be correlated with a radio signal and flash or be displayed in reverse video when its corresponding voice signal is received.

An advantage of the present invention is that it may be readily fitted to existing AM voice radios for aircraft. By coupling apparatus of the present invention in keybutton 12 and adding a data encoder which connects to desired aircraft instruments, and then connecting to the existing AM modulator, data can be transmitted with any voice transmission from transmitter 10. In the present embodiment, both the aircraft and the ground unit have the transmitter 10 and receiver 20. Data may be passed from the aircraft to the ground and from the ground to the aircraft. In a simpler embodiment, data is passed only from the aircraft to the ground with the aircraft receiver being only a voice receiver as is the case in conventional systems.

The present invention may be constructed as a stand-alone unit in an alternative embodiment, and replace the existing aircraft AM radio.

One of the main advantages of the present system is that the amount of transmission between aircraft and ground units is rapidly increasing and the need for quick identification of aircraft is imperative. The present invention can identify an aircraft in short microsecond bursts and also provide important information such as its position, altitude and emergency signals such as low field level or an S.O.S. calls.

Figure 3:
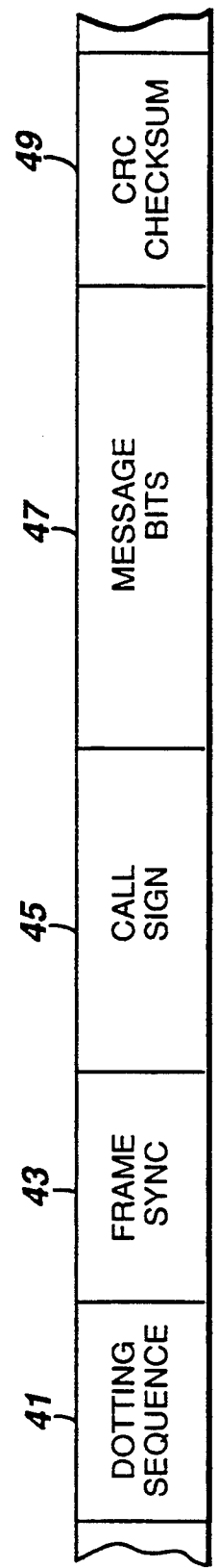
FIG. 3 is an illustration of the data format of data to be encoded and appended to the AM voice transmission.

The encoded data stream which would be transmitted upon activation of the aircraft radio's keybutton is a 50 to 100 millisecond (msec.) transmission, as shown in FIG. 3 encoded by 2 or 4 level AM or subcarrier modulation. For example, the data format may be as follows:
1) a dotting sequence 41, for bit synchronization;
2) a frame synchronization word, 43 (such as a PN sequence) to mark the beginning of the actual data;
3) the aircraft's alphanumeric call sign, 45, as listed on the flight plan strip;
4) an additional field of message bits, 47; and
5) a cyclic redundancy code (CRC) checksum, 49, for error checking.

This data would be received by air traffic control (ATC) equipment and may be displayed to a ground controller in a variety of ways. At the sir traffic control unit, the aircraft's alphanumeric identification ("call sign") would be displayed inside a tag block of the ATC radar display and could flash while the transmission is occurring, and a fixed time thereafter. Aircraft not actively being tracked could have their call-signs displayed at the top of the: radar display.

Figure 4:
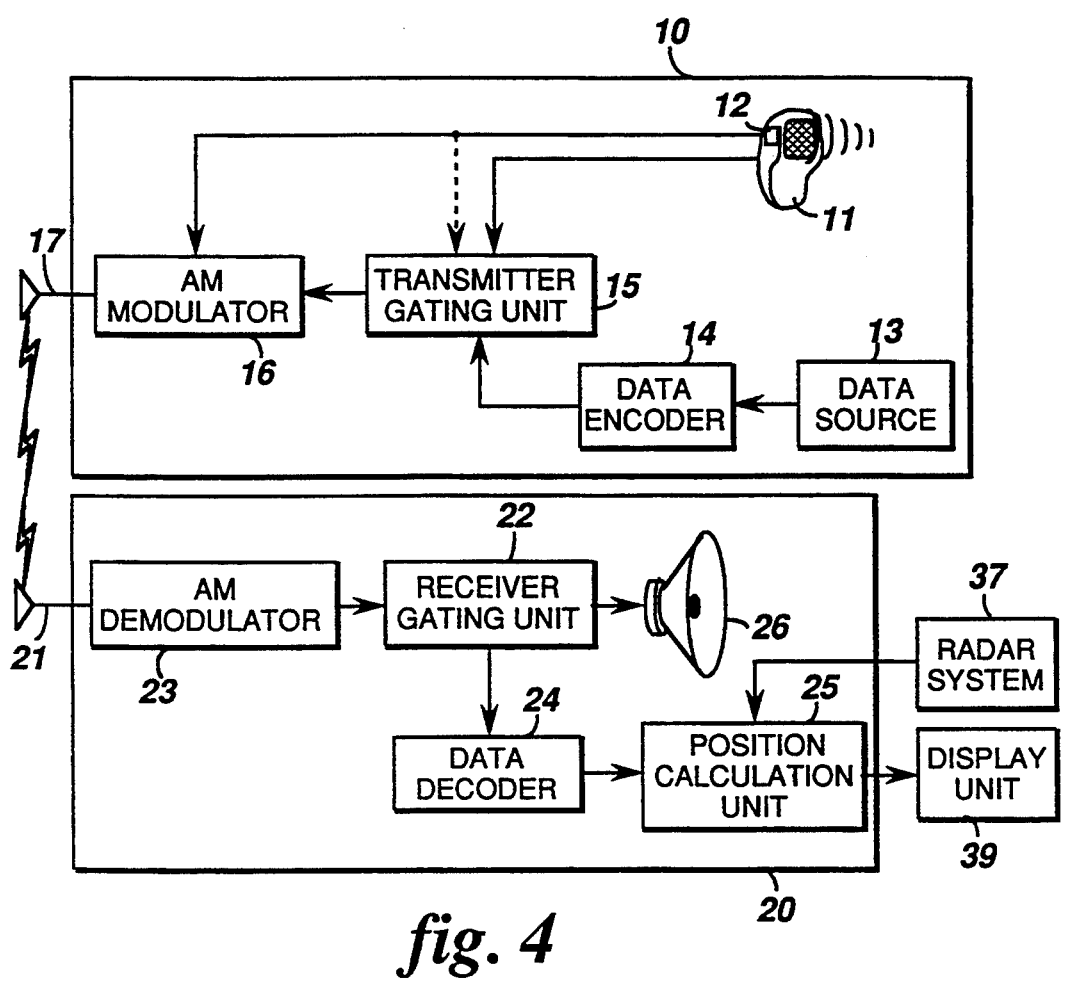
FIG. 4 is a simplified block diagram of a third embodiment of the present invention.

In FIG. 4, data source 13 in the aircraft is a global positioning system (GPS)i or equivalent. The GPS data is encoded by data encoder.14, transmitted to receiver 20, being part of an air traffic control unit, and decoded by data decoder 24 as in embodiments previously described. A position calculation unit 35 determines the position of the aircraft, along with the position of other aircraft. The positions calculated by position calculation unit 35 may be cross-checked against a conventional RADAR system to determine if the: positions are similar. If the positions are very different, an error may have been made in the transmission, and another transmission may be used or alternate means may be used to determine the aircrafts position. The position calculation means may then calculate separations between various aircraft. Position calculation means then displays aircraft positions and other relevant information on a display unit 39.

For a visual flight rules (VFR) tower controller, an additional piece of equipment could display the last several call signs of each aircraft that had been received. Further utility could be added so that flight progress strips are automatically printed as each aircraft requests clearance into the airspace controlled by this tower.

In transmissions from aircraft to air traffic control units, the additional message field could carry any short data communication. Some examples are listed here.
1) A "check-in" bit could be employed to alert the air traffic control unit that this is the first transmission from this aircraft. This could significantly alleviate congestion for departure control frequencies.
2) The altitude indicated by the aircraft's altimeter could be automatically cross-checked with a radar beacon altitude readout (mode-C). Its utility would be greatest for VFR aircraft.
3) Position fix from on-board navigation equipment, e.g., LORAN or global positioning system (GPS). This could provide fixes that could be used for separation in non-radar areas. This would require a device that periodically keys the aircraft's transmitter, to send position information.

Since only one aircraft at a time is permitted to make an instrument approach to a non-radar airport, this could significantly ease congestion in these areas. The transmitted position fixes could be automatically verified against an independent radar fix while the aircraft is enroute. In addition, if a very accurate navigations system, such as GPS or digital global positioning system (DGPS), were employed, this device could be used as a vastly superior replacement for the current generation airport surface detection equipment (ASDE). Current and future planned versions of ASDE are not capable of transmitting a data which may be displayed on a RADAR screen that identifies the aircraft taxiing the runways as does the present invention. Such capabilities may be able to prevent accidents like the recent collision at the Los Angeles International Airport between a US Air 737 and a commuter aircraft.

The simplest embodiment of the present invention which transmits aircraft identifications numbers only, could be added to any existing aircraft radio without opening the case of the radio. A small encoder could be manufactured that plugs in between the microphone and radio input jack. With the addition of a small capacitive circuit, this encoder could be powered by the bias voltage produced by the radio for the microphone. Volume manufacturing (there are about 200,000 to 300,000 general aviation aircraft in North America) could produce these units at a low price affordable to general aviation aircraft owners.

What is claimed is:

1. A method of communicating data over conventional aircraft band amplitude modulated (AM) voice channels between a transmitting unit and a receiving unit comprising the steps of:
   a) acquiring aircraft identification data desired: to be transmitted from a data source at the aircraft;
   b) encoding the acquired data by an AM scheme to produce an AM encoded data signal;
   c) transmitting the AM encoded data signal immediately before or after a 'keyed' aircraft AM voice signal transmission;
   d) receiving the AM voice and AM encoded data signals at the receiving unit;
   e) separating the AM voice and AM encoded data signals;
   f) producing audible speech from the AM voice signal;
   g) decoding the AM encoded dam signals into aircraft identification data; and
   h) employing the decoded data in identifying the audible speech with the aircraft identification data and for utilizing the data in equipment of the receiving unit.

2. The method of claim 1 wherein the receiving unit is an air traffic control unit.

3. The method of claim 2 wherein the step of acquiring aircraft identification data desired to be transmitted further comprises acquiring data from navigation instruments of the aircraft.

4. The method of claim 2 wherein the step of acquiring aircraft identification data desired to be transmitted further comprises acquiring data from information keyed into a device.

5. The method of claim 4 wherein the step of acquiring aircraft identification data comprises acquiring aircraft identification information which has been keyed into a storage device.

6. The method of claim 4 wherein the step of acquiring aircraft identification data comprises acquiring flight identification information which has been keyed into a storage device.

7. The method of claim 1 wherein the step of encoding the acquired data by an AM scheme comprises encoding the acquired data by 2 level amplitude modulation.

8. The method of claim 1 wherein the step of encoding the acquired data by an AM scheme comprises encoding the acquired data by 4 level amplitude modulation.

9. The method of claim 1 wherein the step of encoding the acquired data by an AM scheme comprises encoding the acquired data by subcarrier modulation.

10. The method of claim 1 wherein the decoded data is employed to correlate a radar representation of the aircraft with the aircraft identifiation.

11. The method of claim 1 wherein the decoded data is employed in correlating a radar representation of the aircraft with the audible speech from that aircraft.

12. A data communication device for retrofitting conventional aircraft amplitude modulated (AM) voice transceivers, the transceivers comprising a microphone, AM modulator, an antenna, an AM demodulator, and an audio output unit, the data communication device allowing data to be transmitted from an aircraft to a receiving unit comprising:
   a) a data collection unit for collecting aircraft identification data desired to be transmitted;
   b) a data encoder coupled to the data collection unit for encoding the collected data into an encoded data signal;
   c) a gating means coupled to said microphone, the data encoder, and said AM modulator for passing the encoded data signal immediately preceding or following a voice signal to the AM modulator sequentially when the microphone is keyed, causing a signal to be transmitted to an antenna of said receiving unit;
   d) a data decoder for decoding the AM data signal into the aircraft identification data when provided an AM encoded data signal;
   e) a receiver gating means coupled to said AM demodulator said audio output unit, and the data decoder of the receiving unit, for switching the signal received from the AM demodulator to said audio output unit for an AM voice signal to produce audible speech, and switching to the data decoder for an AM encoded data signal;
   f) output equipment coupled to the data decoder for identifying the audible speech with the aircraft identification data and for utilizing the decoded data.

13. The data communication device of claim 12 wherein the receiving unit is an air traffic control unit.

14. The data communication device if claim 13 wherein the output equipment comprises a display means for displaying data identifying the aircraft corresponding to the audible speech produced.

15. The data communication device of claim 13 wherein the data collection unit comprises a device capable of providing aircraft identification information keyed into it.

16. The data communication device of claim 13 wherein the data collection unit comprises a device capable of providing flight identification information keyed into it.

17. The data communication device of claim 13 further comprising global positioning system (GPS) which provides positional data that is transmitted from the aircraft to the air traffic control unit and the output equipment comprises a position calculation means which calculates the position of any aircraft which the air traffic control is communicating and, relative spacing between these aircraft from the positional data, and a display means for displaying the aircraft positions and relative spacing between them.

18. The data communication device of claim 12 further comprising navigation instruments which provide data which is encoded and transmitted to the receiving unit.

19. The data communication device of claim 12 wherein the data collection unit comprises a device capable of providing stored information previously keyed into it.

20. The data communication device of claim 12 wherein the data data encoder comprises an encoder which encodes data in a 2 level amplitude modulation format.

21. The data communication device of claim 12 wherein the data encoder comprises an encoder which encodes data in a 4 level amplitude modulation format.

22. The data communication device of claim 12 wherein the data data encoder comprises an encoder which encodes data by subcarrier modulation.

23. The data communication device of claim 12 wherein the output equipment comprises a superposition means coupled a radar screen for superimposing the aircraft identification data on the radar screen at a location corresponding to the aircraft.

24. A data communication system for transmitting data from an aircraft to a receiving unit over conventional aircraft amplitude modulated (AM) voice bands, comprising:
   a) a microphone, for creating a voice signal when it is keyed and receives an audible signal;
   b) a data collection unit for collecting aircraft identification data desired to be transmitted;
   c) a data encoder coupled to the data collection unit for encoding the collected data into an encoded data signal;
   d) an AM modulator for transmitting an AM radio-frequency (RF) signal when provided an input signal;
   e) a gating means coupled to the microphone, the data encoder, and the AM modulator for passing the encoded data signal followed by the voice signal to the AM modulator sequentially as an input signal when the microphone is keyed, causing a signal to be transmitted to a receiving unit;
   f) a receiver at said receive unit for decoding the voice signal into audible speech and the encoded data signal into transmitting unit identification data;
   g) output equipment coupled to the data decoder for identifying the audible speech with the transmitting unit identification data and for utilizing the decoded data.

25. The data communication system of claim 24 wherein the receiver comprises:
   a) an AM demodulator for demodulating a received signal into a demodulated signal;
   b) an audio output unit for creating audible speech from a voice signal;
   c) a data decoder for decoding a data signal into data;
   d) a receiver gating means coupled to the AM demodulator, audio output unit and the data decoder, for switching the demodulated signal to an audio output for a voice signal and switching the demodulated signal to the data decoder for a data signal.

* * * * *